US012120494B2

(12) United States Patent
Orth

(10) Patent No.: US 12,120,494 B2
(45) Date of Patent: Oct. 15, 2024

(54) LOUDSPEAKER SYSTEM WITH OVERHEAD SOUND IMAGE GENERATING (E.G., ATMOS™) ELEVATION MODULE AND METHOD AND APPARATUS FOR DIRECT SIGNAL CANCELLATION

(71) Applicant: Polk Audio, LLC, Vista, CA (US)

(72) Inventor: Scott Orth, Baltimore, MD (US)

(73) Assignee: Polk Audio, LLC, Vista, CA (US)

( * ) Notice: Subject to any disclaimer, the term of this patent is extended or adjusted under 35 U.S.C. 154(b) by 328 days.

(21) Appl. No.: 17/294,365

(22) PCT Filed: Nov. 12, 2019

(86) PCT No.: PCT/US2019/060900
§ 371 (c)(1),
(2) Date: May 14, 2021

(87) PCT Pub. No.: WO2020/102183
PCT Pub. Date: May 22, 2020

(65) Prior Publication Data

US 2021/0409866 A1 Dec. 30, 2021

Related U.S. Application Data

(60) Provisional application No. 62/767,965, filed on Nov. 15, 2018.

(51) Int. Cl.
*H04R 3/14* (2006.01)
*H04S 7/00* (2006.01)

(52) U.S. Cl.
CPC ............... *H04R 3/14* (2013.01); *H04S 7/303* (2013.01)

(58) Field of Classification Search
None
See application file for complete search history.

(56) References Cited

U.S. PATENT DOCUMENTS

| | | | |
|---|---|---|---|
| 4,489,432 | A | 12/1984 | Polk |
| 4,497,064 | A | 1/1985 | Polk |
| 4,569,074 | A | 2/1986 | Polk |
| 8,054,980 | B2 | 11/2011 | Wu et al. |

(Continued)

FOREIGN PATENT DOCUMENTS

WO WO 2018/112335 A1 6/2018

OTHER PUBLICATIONS

European Search Report for EP 19885348.3 corresponding to PCT/US2019/060900 dated Dec. 18, 2023.

(Continued)

*Primary Examiner* — Kenny H Truong
(74) *Attorney, Agent, or Firm* — J. Andrew McKinney, Jr.; McKinney & Associates, LLC

(57) ABSTRACT

A loudspeaker system (200) includes an overhead sound image generating (e.g., ATMOS™) elevation sound projecting loudspeaker transducer or array (210) for reproducing an elevation signal and a second cancellation loudspeaker or transducer array (250) for generating and projecting a direct signal cancellation. The cancellation speaker or array (250) is driven with a filtered, polarity reversed version of the elevation signal to cancel undesired direct sound (160) from elevation speaker (210) which would otherwise diminish the quality of elevation signal reproduction for a listener L.

6 Claims, 8 Drawing Sheets

(56) References Cited

U.S. PATENT DOCUMENTS

| | | | | |
|---|---|---|---|---|
| 9,374,640 | B2 | 6/2016 | Starobin | |
| 9,648,440 | B2 | 5/2017 | Crockett et al. | |
| 9,736,577 | B2 | 8/2017 | Yamamoto et al. | |
| 9,865,245 | B2 | 1/2018 | Kamdar | |
| 10,217,451 | B2 | 2/2019 | Kamdar et al. | |
| 10,863,276 | B2 * | 12/2020 | Walther | H04R 1/345 |
| 10,902,838 | B2 | 1/2021 | Kamdar et al. | |
| 11,190,877 | B2 | 11/2021 | Kamdar et al. | |
| 2008/0273713 | A1 | 11/2008 | Hartung et al. | |
| 2010/0119089 | A1 | 5/2010 | Tracy | |
| 2012/0163614 | A1 | 6/2012 | Asada et al. | |
| 2015/0304791 | A1 * | 10/2015 | Crockett | H04R 3/14 381/307 |
| 2017/0053641 | A1 * | 2/2017 | Kamdar | G10K 11/178 |
| 2017/0127211 | A1 | 5/2017 | Crockett et al. | |
| 2017/0164134 | A1 | 6/2017 | Yamamoto | |
| 2017/0208392 | A1 | 7/2017 | Smithers et al. | |
| 2017/0325019 | A1 | 11/2017 | Bezzola et al. | |
| 2018/0103316 | A1 | 4/2018 | Faller et al. | |
| 2018/0184202 | A1 | 6/2018 | Walther et al. | |
| 2018/0192185 | A1 | 7/2018 | Starobin | |
| 2018/0242077 | A1 | 8/2018 | Smithers et al. | |
| 2018/0367939 | A1 | 12/2018 | Fischer et al. | |
| 2019/0116445 | A1 * | 4/2019 | Gerrard | H04S 7/303 |
| 2022/0159397 | A1 | 5/2022 | Starobin et al. | |

OTHER PUBLICATIONS

International Search Report for PCT/US19/60900 dated Feb. 4, 2020 (pp. 1-2).

International Preliminary Report on Patentability for PCT/US60900 dated Feb. 4, 2020 (pp. 1-7).

* cited by examiner

Simulation of Elevation Module Direct Sound Canceller

- B1 = time of flight of direct sound from D1
- B2 = time of flight of reflected sound from D1
- B3 = time of flight of direct sound from D2, also polarity inversion
- B4 = time of flight of reflected sound from D2, also polarity inversion
- H2 = simulation of directivity of D1
- H5, H3 = bandpass filter
- H4 = simulation of directivity of D2

D1 combined signals. 1/3rd octave smoothed.
Note: shelf type response with corner frequency at about 2kHz Frequency response with cancellation (dashed)
Note less output below 2kHz

LOUDSPEAKER SYSTEM WITH OVERHEAD SOUND IMAGE GENERATING (E.G., ATMOS™) ELEVATION MODULE AND METHOD AND APPARATUS FOR DIRECT SIGNAL CANCELLATION

PRIORITY CLAIM AND REFERENCE TO RELATED APPLICATIONS

This application claims priority to and benefit of (a) U.S. Provisional Application No. 62/767,965 (filed Nov. 15, 2018) and (b) US PCT Application PCT/US19/60900 (filed Nov. 15, 2019) both by Scott ORTH and entitled "Loudspeaker System with Overhead Sound Image Generating (e.g., ATMOS™) Elevation Module and Method and apparatus for Direct Signal Cancellation," the disclosures of which are hereby incorporated herein by reference.

BACKGROUND OF THE INVENTION

Field of the Invention

The present invention relates to reproduction of sound and more specifically to the application of acoustic and psychoacoustic principles in the design of a loudspeaker system adapted for use in multi-channel systems generically known as "home theater" systems which typically include a plurality of loudspeakers arrayed in front of, beside and behind a listener.

Discussion of the Prior Art

Traditional home-theater installations (e.g., 10 as shown in FIGS. 1A and 1B) are configured to provide "surround sound" and require the use or installation of multiple pairs of loudspeakers (e.g., a pair of front speakers 16, 18, and two pairs of surround channel loudspeakers placed laterally (26, 28) and behind 30, 32) the seating area 24, per industry-standard Dolby Digital™ and compatible formats. So traditional home theater setups place the listener in a room 12 at a listening position 24 in front of a screen or display 14 with the loudspeakers all aimed at the listening position 24.

Unlike home theater systems, modern commercial Cinemas are now equipped with sound systems designed to create an "immersive" or "3-D" sound field with loudspeakers mounted vertically above the listeners to create sound images which come from sources that are in front, behind, beside and overhead. For example, the Dolby® Atmos™ system places loudspeakers in or on the theater's ceiling to provide overhead sound sources, and reproduction of Dolby® Atmos™ "height" or elevation program material is now possible using loudspeakers in the home, as described Dolby's U.S. Pat. No. 9,648,440, the entire disclosure of which is incorporated by reference (for purposes of defining the background and nomenclature of this field). A consumer or home theater enthusiast who cannot equip their home using commercial cinema sound equipment and wants to recreate the immersive 3-D sound field experienced with the Dolby® Atmos™ system can configure and install a system such as that illustrated in Dolby's U.S. Pat. No. 9,648,440.

Many home theater listeners enjoy the use of full-range floor standing loudspeaker systems such as loudspeakers which incorporate features in commonly owned U.S. Patents: (a) U.S. Pat. No. 4,489,432, (b) U.S. Pat. No. 4,497,064 and (c) U.S. Pat. No. 4,569,074, the entireties of which are incorporated herein by reference, for purposes of providing background information and nomenclature and enablement purposes. Tower-shaped loudspeakers (e.g., 50, as shown in FIGS. 1C, 1D and 1E) have a tall loudspeaker cabinet or enclosure. An Atmos™ module or virtual height loudspeaker (e.g., 110) may be configured for installation upon and use with a conventional left or right channel tower speaker system (e.g., 50) to provide a height or elevation speaker (or array of speakers or transducers) aimed to project sound 150 toward a room's ceiling for reflection toward the listener (e.g., as shown in FIGS. 1C-1E). Virtual height speakers or transducers in upward firing elevation modules such as that shown in FIGS. 1C-1E (or described in Dolby's U.S. Pat. No. 9,648,440) are not entirely satisfactory in actual use, however, because top-firing virtual height speakers do not radiate sound 150 (for the overhead sound image) solely toward the ceiling, and thus create subtly flawed reproduced sound at the listening position 24. The sonic flaws arise from the listener's perception of the directly radiated sound from height loudspeaker 110 which follows a substantially horizontal line directly toward listening position 24.

There is a need, therefore, for a more effective, satisfying and unobtrusive system and method for providing high-fidelity playback of cinema sound in a home theater user's listening space when the user seeks to recreate or simulate the immersive 3-D sound field experienced with modern commercial cinema systems such as the Dolby® Atmos™ system.

OBJECTS AND SUMMARY OF THE INVENTION

In accordance with the present invention, an accessory or modular loudspeaker system is configured to project a height channel sound at a ceiling in a listener's room, while simultaneously eliminating the sonic problems arising from a height or elevation speaker's sound (for the overhead sound image) radiating directly toward the listener.

The elevation module equipped direct sound cancelling speaker system of the present invention is configured to provide satisfying playback of cinema sound in a home theater user's listening space when the user seeks to recreate or simulate the immersive sound field experienced with modern commercial cinema sound field generating systems such as the Dolby® Atmos™ system.

The upwardly aimed Elevation module loudspeaker systems of the present invention generate or create the sonic illusion (or phantom sound) simulating playback from conventional separate, ceiling mounted overhead sound image loudspeakers, each reproducing a unique overhead channel's program material, and each Elevation module is constructed using Dolby's recommended configurations require high directivity arrays above roughly 1 kHz. This usually leaves a significant direct signal component in the midrange (radiating directly to the listener's head), when only the sound reflected from the ceiling 150 is desired. Improving directivity at midrange and lower frequencies by pure acoustical means would require use of large transducers or horns in the elevation speaker, which is typically impractical.

In accordance with the present invention, improving directivity and enhancing the perceived overhead sound image is accomplished by actively using another signal to cancel the unwanted direct signal. The loudspeaker system of the present invention includes first and second distinct sound elevation signal related sources, namely (a) the top-firing elevation speaker (i.e., transducer or array) and (b) a cancellation speaker (i.e., transducer or array). The cancellation speaker is preferably driven with band-pass filtered signal to limit cancellation to midrange frequencies only. An all-pass filter may allow cancellation speaker to reinforce low frequencies, while High frequencies are adequately controlled by the top speaker. Directivity of the cancellation or cancelling speaker is preferably chosen to reduce unwanted reflections, especially from the floor and ceiling. Hence, larger transducers are better for use in the cancellation speaker (or array). The distance from cancellation speaker to listener L (e.g., at listening position 24) should be as close as possible to the distance of top firing elevation speaker to listener L to reduce phase error (leading to less effective cancellation).

The above and still further features and advantages of the present invention will become apparent upon consideration of the following detailed description of a specific embodiment thereof, particularly when taken in conjunction with the accompanying drawings.

BRIEF DESCRIPTION OF THE DRAWINGS

The following detailed description of the present invention is taken in conjunction with reference to the following drawings, wherein the same reference numbers in in the different Figures indicate similar or identical components.

DESCRIPTION OF THE PREFERRED EMBODIMENT

Figure 1A:
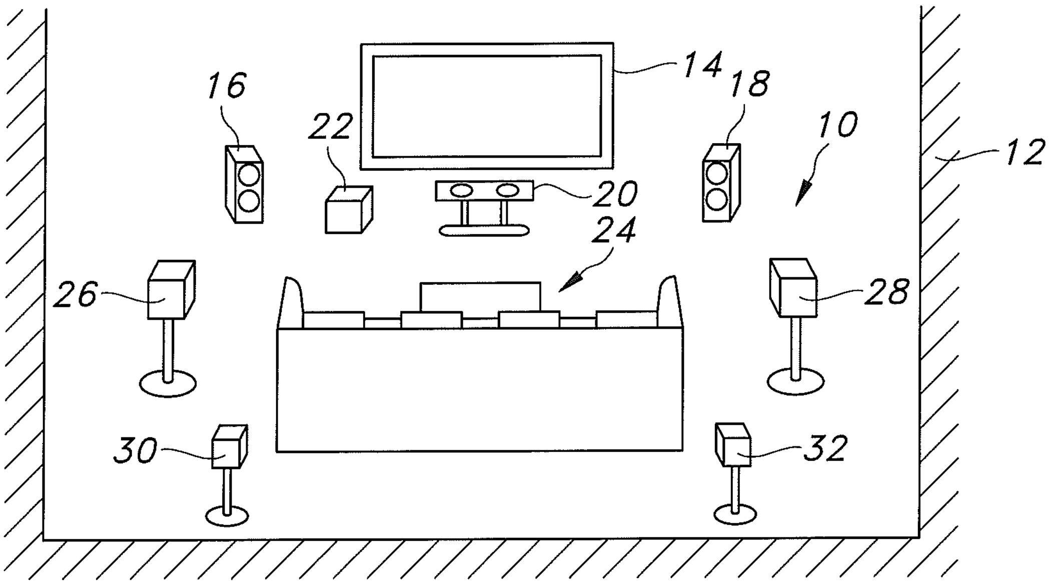
FIG. 1A (PRIOR ART)
FIGS. 1A and 1B illustrate loudspeakers configured for use in a home theater system, in accordance with the prior art.
Figure 1B:
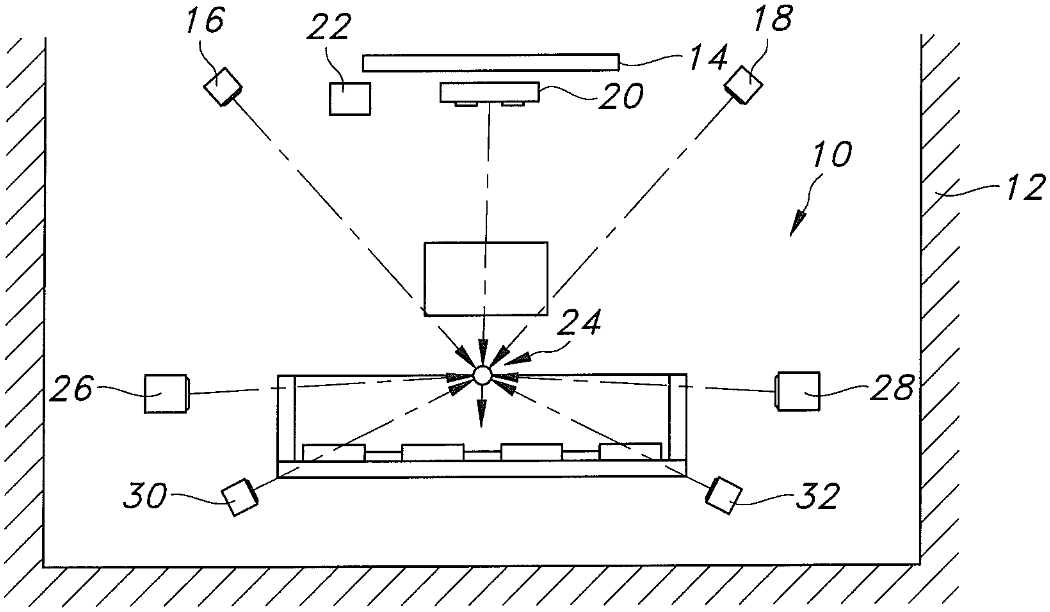
FIG. 1B (PRIOR ART)
Figures 1C, 1D, 1E:
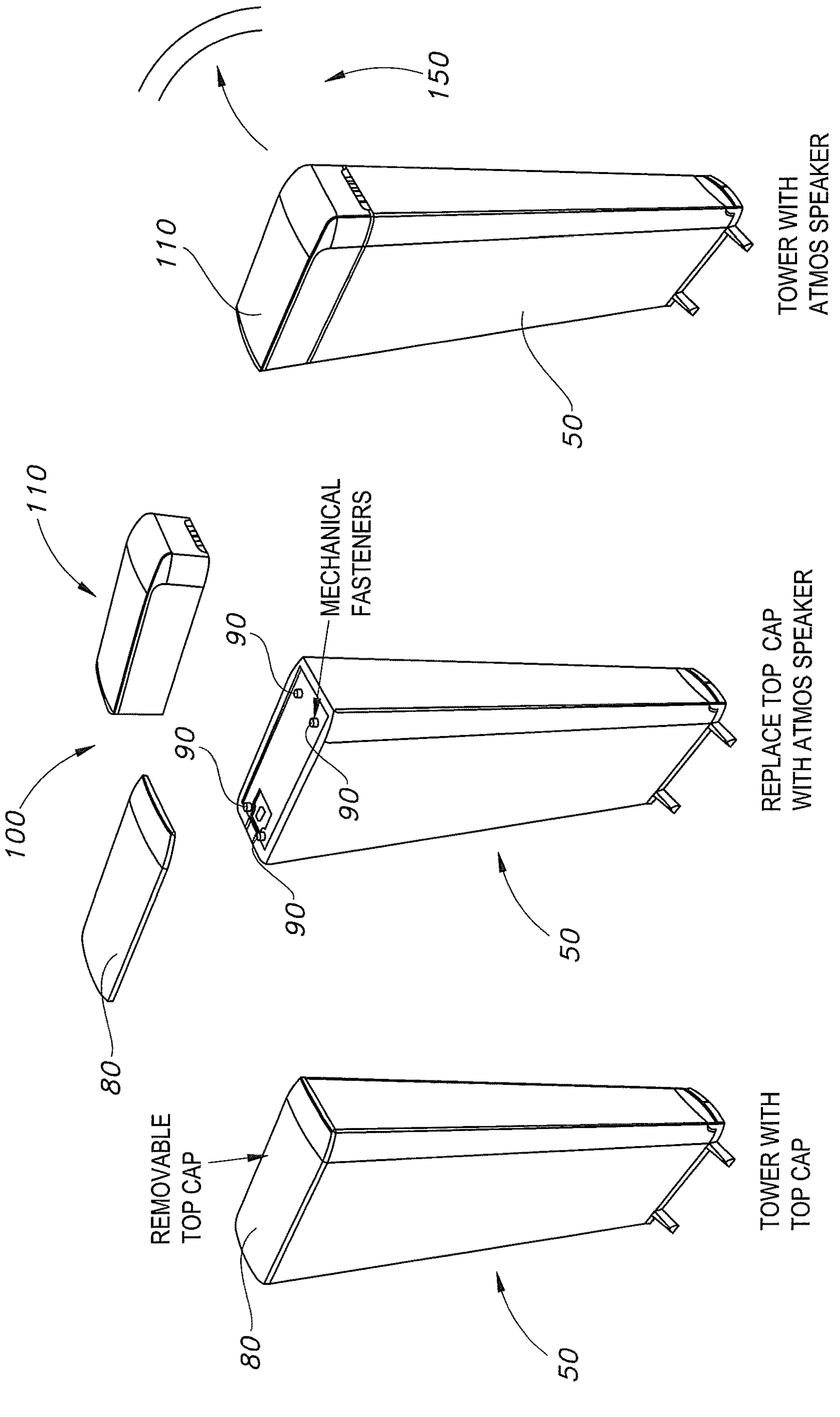
FIGS. 1C, 1D and 1E illustrate a loudspeaker system configured to receive and work with an elevation speaker module, in accordance with the prior art.
Figure 2:
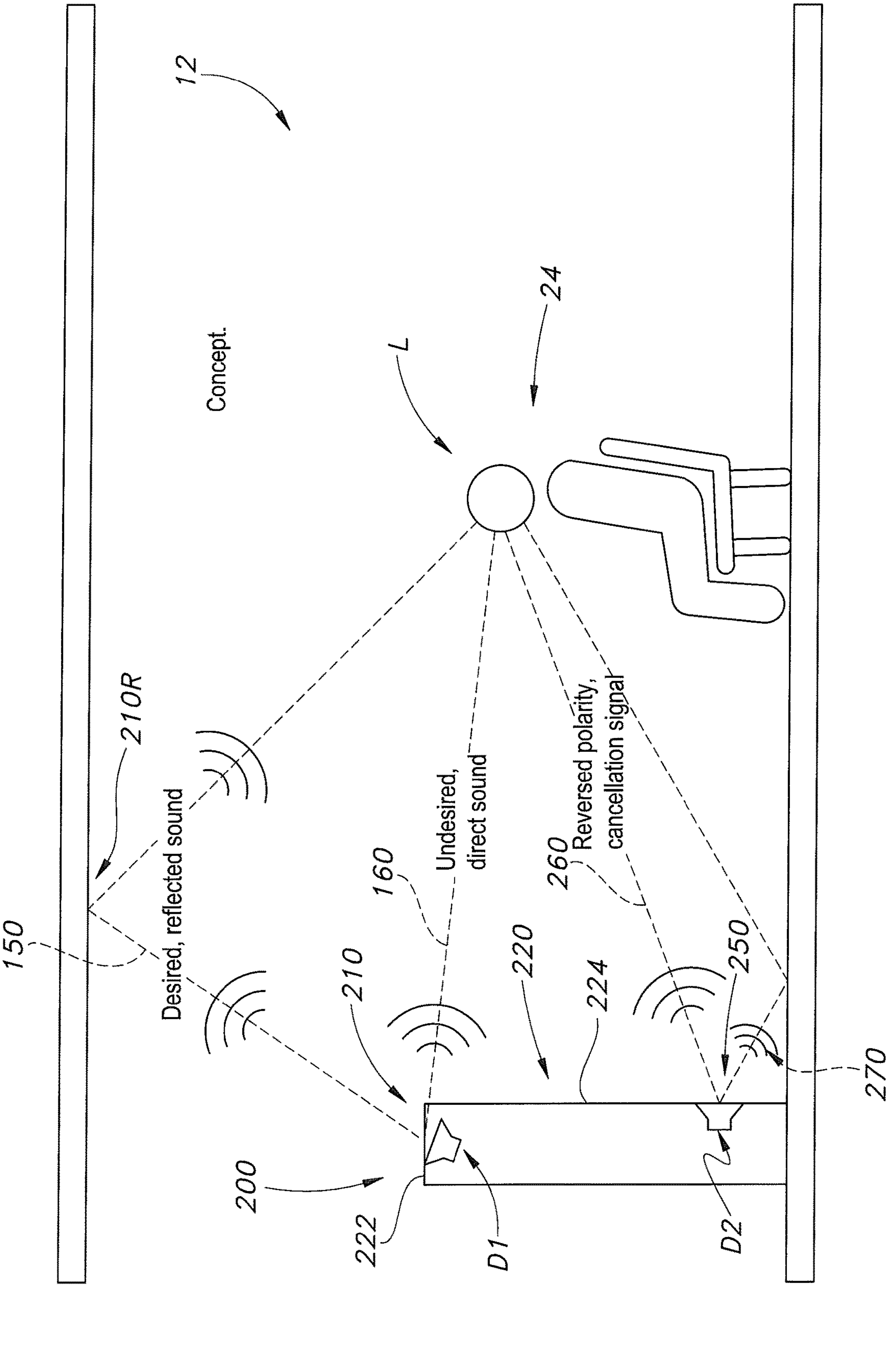
FIG. 2 is a diagram illustrating the Loudspeaker System with Overhead Sound Image Generating (e.g., ATMOS™) Elevation Module in a room with a seated listener, showing the orientation and position of the elevation speaker, the listener's ears, and the cancellation speaker, in accordance with the present invention.

Turning to FIGS. 2-7C, the Loudspeaker System 200 includes an Overhead Sound Image Generating (e.g., ATMOS™) Elevation Module 210 and also includes a cancellation driver or transducer array 250 configured for Direct Signal Cancellation. As noted above, an upwardly aimed Elevation module equipped loudspeaker system 200 generates or creates the sonic illusion (or phantom sound) simulating playback from conventional separate, ceiling mounted loudspeakers, each reproducing a unique overhead channel's program material, and each Elevation module 210 is constructed using Dolby's recommended configurations requiring high directivity arrays above roughly 1 kHz. This leaves a significant direct signal component 160 in the midrange (radiating directly to the listener's head L, as best seen in FIG. 2), when only the sound reflected from the ceiling 150 is desired. In accordance with the method of the present invention, directivity at midrange and lower frequencies is improved by actively generating and using a cancellation signal 260 to acoustically cancel the unwanted direct signal 160.

The loudspeaker system of the present invention 200 includes First and Second elevation signal related sound sources, namely (a) the Top-firing elevation speaker (i.e., transducer or array) D1 or 210 and (b) a Cancellation speaker (i.e., transducer or array) D2 or 250. Cancelling speaker 250 is band pass filtered to limit cancellation to midrange frequencies only, a strategy which relies on the fact that Low frequencies are less localizable for the listener. An all pass filter may allow cancellation speaker 250 to reinforce low frequencies, while High frequencies are adequately controlled by the top-mounted elevation speaker D1 or 210. The directivity of cancelling speaker 250 is preferably chosen to reduce unwanted reflections (e.g., 270), especially from the floor and ceiling. Hence, larger transducers are better for cancellation speaker 250. The distance from cancelling speaker 250 to listener L is preferably substantially equal to or as close as possible to the distance of top firing speaker 210 to listener L in order to reduce phase error (leading to less effective cancellation). The Haas effect helps listener L to localize the top speaker reflection sound 150.

Figure 3:
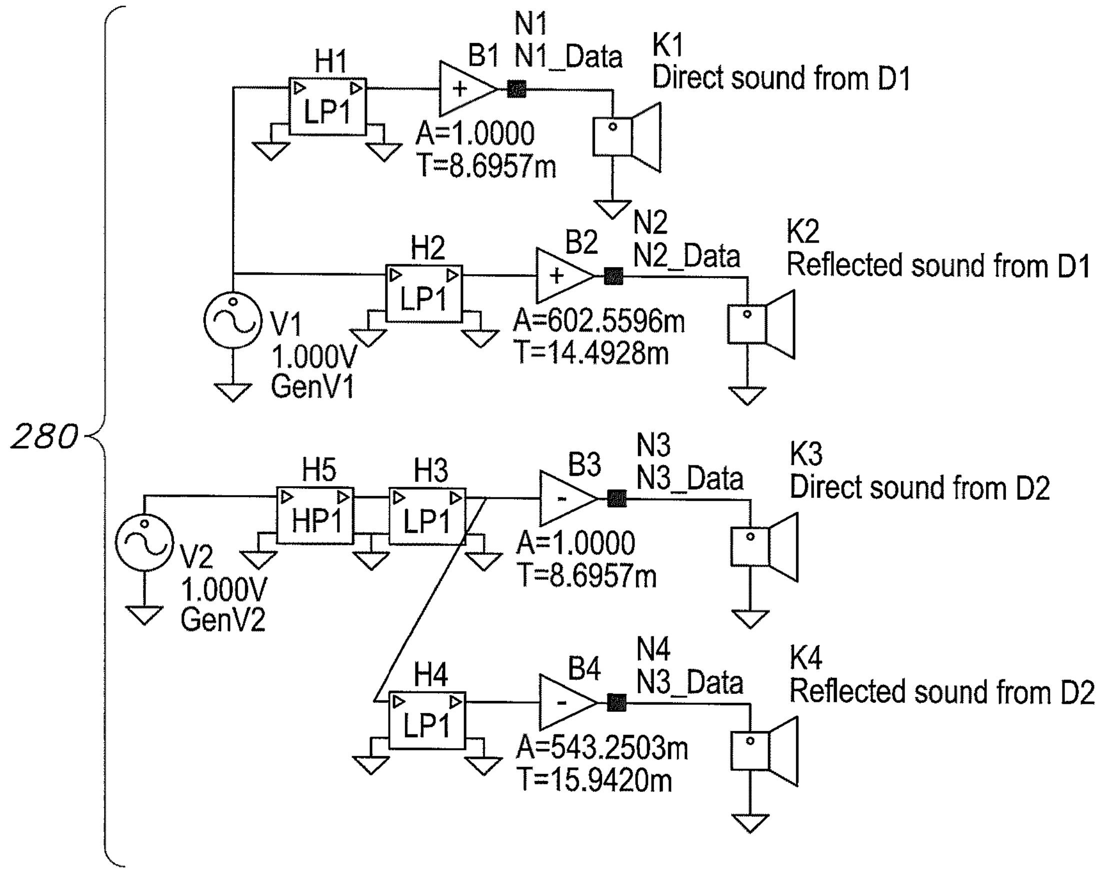
FIG. 3 is a diagram illustrating the simulated acoustic effects of the Elevation Module or Overhead Sound Image Generating (e.g., ATMOS™) speaker of FIG. 2 in the room of FIG. 2 with delays from elevation and cancelling speakers to the Listener, in accordance with the method of the present invention.

FIG. 3 is a diagram illustrating a model or Simulation of the Elevation Module Direct Sound cancellation system and method of the present invention. Referring to diagram 280, the acoustic cancellation is accomplished by creating and radiating a phase inverted (or reverse polarity) version of the direct signal from cancellation speaker 250 which, when combined in air, acoustically cancels the undesired direct radiation 160 for listener L. Referring again to diagram 280 in FIG. 3:

TABLE 1

| |
|---|
| B1 = time of flight of direct sound from D1 |

TABLE 1-continued

B2 = time of flight of reflected sound from D1
B3 = time of flight of direct sound from D2, also polarity inversion
B4 = time of flight of reflected sound from D2, also polarity inversion
H2 = simulation of directivity of D1
H5, H3 = bandpass filter, and
H4 = simulation of directivity of D2

Figure 4:
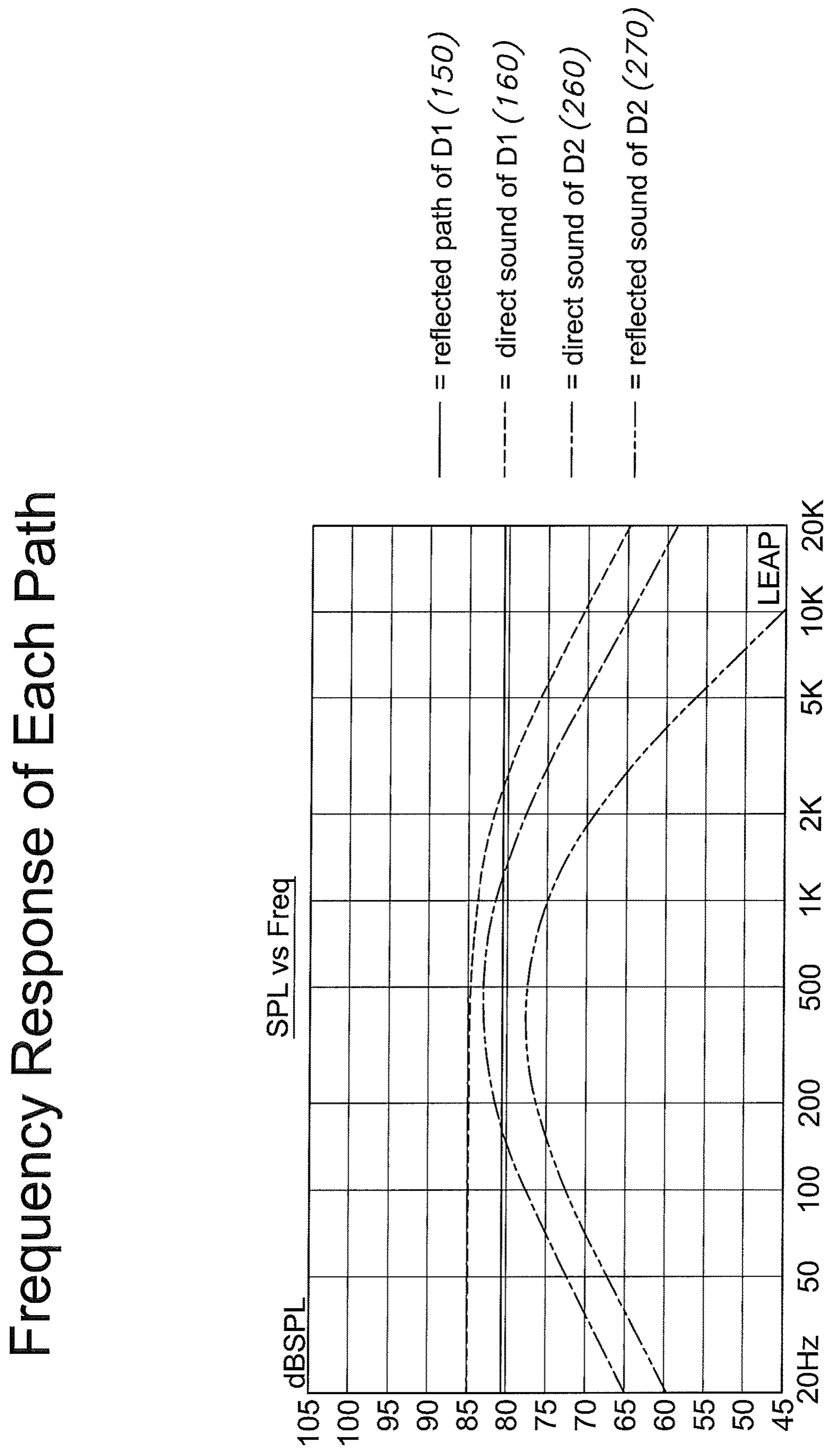
FIG. 4 is a LEAP™ system generated frequency response plots for the loudspeaker system of FIG. 2, showing the frequency response for the reflected path of elevation speaker D1, the frequency response for the direct path of elevation speaker D1, the frequency response for the direct path of cancellation speaker D2, and the frequency response for the reflected sound of cancellation speaker D2, in accordance with the method of the present invention.

FIG. 4 illustrates the Frequency Response for each path for sound from of a Loudspeaker System 200 with the Overhead Sound Image Generating (e.g., ATMOS™) Elevation Module 210 and the Direct Signal Cancellation speaker 250.

In accordance with the present invention, the user's listening room 12 has a reflective overhead surface or ceiling and one or more of the improved overhead sound image generating loudspeaker systems 200 configured to simultaneously generate a first upwardly projecting sound field 150 which is aimed to reflect from the ceiling of room 12 and project downwardly to the listener's position 24 to create a simulated overhead sound field for the listener, and a second cancellation signal 250 with which unwanted direct sound 160 is cancelled, diminished or attenuated to provide a more satisfying playback of cinema sound in a home theater user's listening space 10 when the user seeks to recreate or simulate the immersive sound field experienced with modern commercial immersive sound field generating systems such as the Dolby® Atmos™ system.

Figure 5:
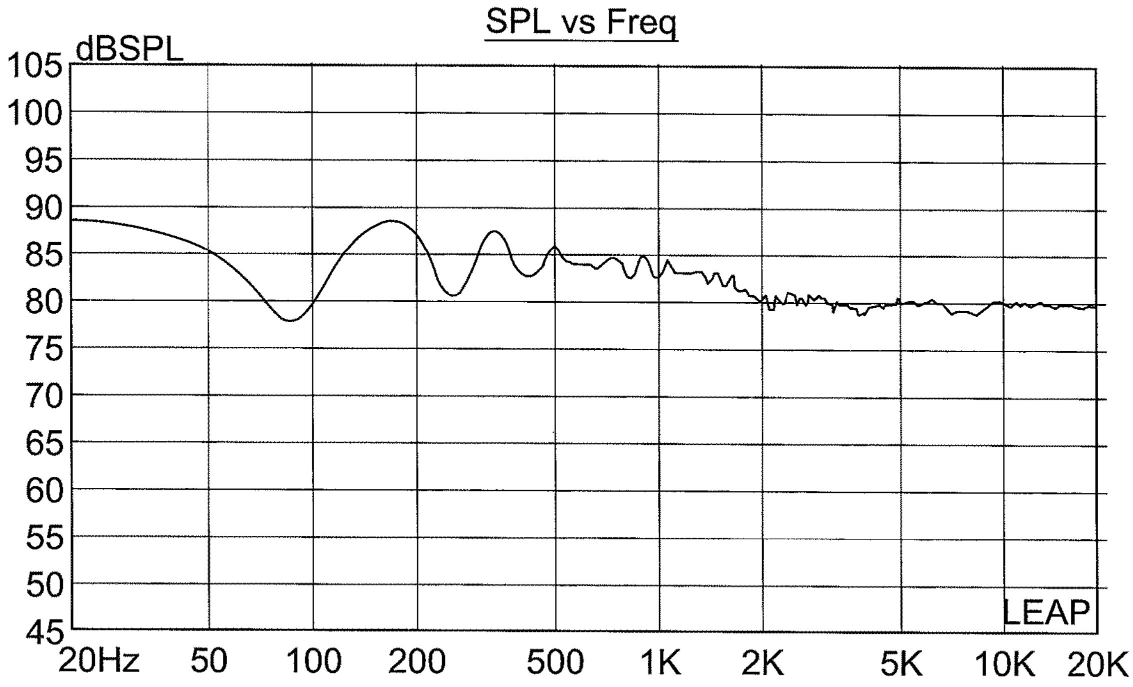
FIG. 5 is a LEAP™ system generated frequency response plot for the elevation speaker D1 in the loudspeaker system of FIG. 2, showing the frequency response for the combined (direct and reflected) signals (⅓ octave smoothed) and illustrating a shelf-type response with a corner frequency at about 2 kHz, in accordance with the present invention.
Figure 6:
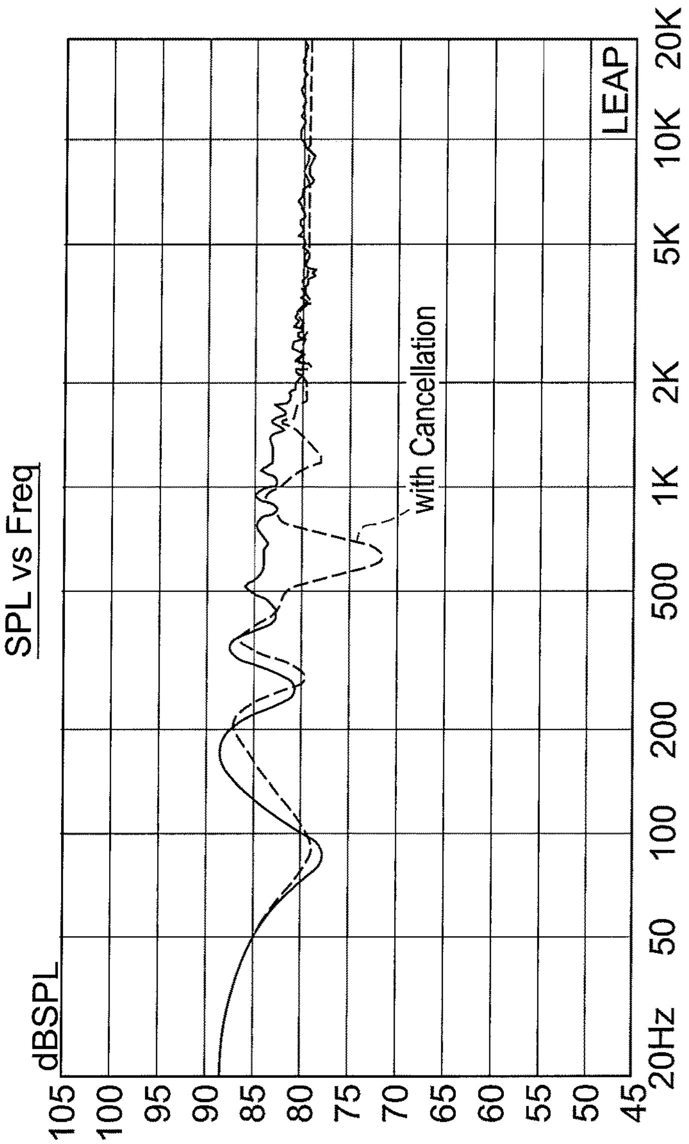
FIG. 6 is a LEAP™ system generated frequency response plot for the elevation speaker D1 in the loudspeaker system of FIG. 2, showing the frequency response for the combined (direct and reflected) signals (⅓ octave smoothed) as shown in FIG. 5 and further illustrating (in the trace of dashed lines) the effect of adding the cancellation driver's contribution, in accordance with the method of the present invention.

As illustrated in FIGS. 2-6, the improved system 200 provides improved simulated height signal directivity as perceived by listener L by actively generating and using a cancellation signal 260 from cancellation driver or transducer 250 to cancel the unwanted direct signal 160. The loudspeaker system of the present invention 200 includes two sound elevation or height speaker signal related sources, namely (a) the top-firing transducer or array 210 and (b) a cancellation transducer or array 250. The cancelling speaker 250 is preferably band pass filtered to limit cancellation to midrange frequencies only (as shown in FIGS. 5 and 6). An all-pass filter may allow cancellation speaker 250 to reinforce low frequencies, while High frequencies are adequately controlled by the top speaker 210. Directivity of the cancelling speaker 250 is preferably chosen to reduce unwanted reflections, especially from the floor and ceiling in room 12. Hence, larger transducers are better for cancelling speaker 250. The distance from cancelling speaker 250 to listener L should be as close as possible to the distance of top firing speaker 210 to listener L to reduce phase error (leading to less effective cancellation).

Referring to FIG. 5, a plot of SPL as a function of frequency illustrates the frequency response for the combined signals from Driver array D1 or 210, where D1 combined signals are averaged in ⅓ octave intervals or shown ⅓rd octave smoothed. This plot illustrates a shelf-type response with a corner frequency at about 2 kHz. The audible effects of the system and method of the present invention are shown by comparing the frequency response of FIG. 5 with the plot of FIG. 6, which shows the frequency response with cancellation (in grey). Note that there is less output below 2 kHz.

Thus, system 200 renders an overhead sound image using reflected sound generating transducers or elements 210 and cancellation sound generating transducers or elements 250 and includes, at a speaker location in room 12, a housing enclosing an upward-firing overhead sound image generating driver or array 210 oriented at an inclination angle relative to the ground plane and configured to reflect sound off an upper surface or ceiling to produce a desired reflected sound 150 from a what the listener L perceives as a reflected/phantom overhead speaker location. System 200 includes a crossover network with a virtual height filter applying a frequency response curve (see, e.g., FIGS. 5 and 6) to the audio signal transmitted to the upward-firing overhead sound image generating driver or array 210, where the virtual height filter at least partially removes directional cues from the speaker system location and at least partially inserts the directional cues from the reflected/phantom overhead speaker location. The frequency response curve is based on (a) a first frequency response of a filter modeling sound 150 travelling directly from the reflected/phantom overhead speaker location to the ears of the listener at the listening position, for inserting directional cues from the reflected/phantom overhead speaker location, and (b) a second filter frequency response of a filter modeling sound travelling directly from the speaker location to the ears of the listener at the listening position, to removing directional cues for audio travelling along a path directly from the speaker location to the listener. Speaker system 200 further includes, preferably in the enclosure's front baffle, a floor-level mounted cancellation driver or array 250 oriented toward the listening position. The crossover's second filter (i.e., the filter modeling sound travelling directly from the speaker location to the ears of the listener at the listening position) inverts (or polarity is reversed) the undesired direct sound signal to generate a cancellation signal, where the cancellation signal is input to cancellation driver 250, whereby, when the system is played, the undesired direct sound 160 is cancelled by cancellation signal sound 260, thereby removing or cancelling the undesired sound 160 radiating directly from the upward-firing overhead sound image generating driver or array 210 to the listener.

Figure 7A:
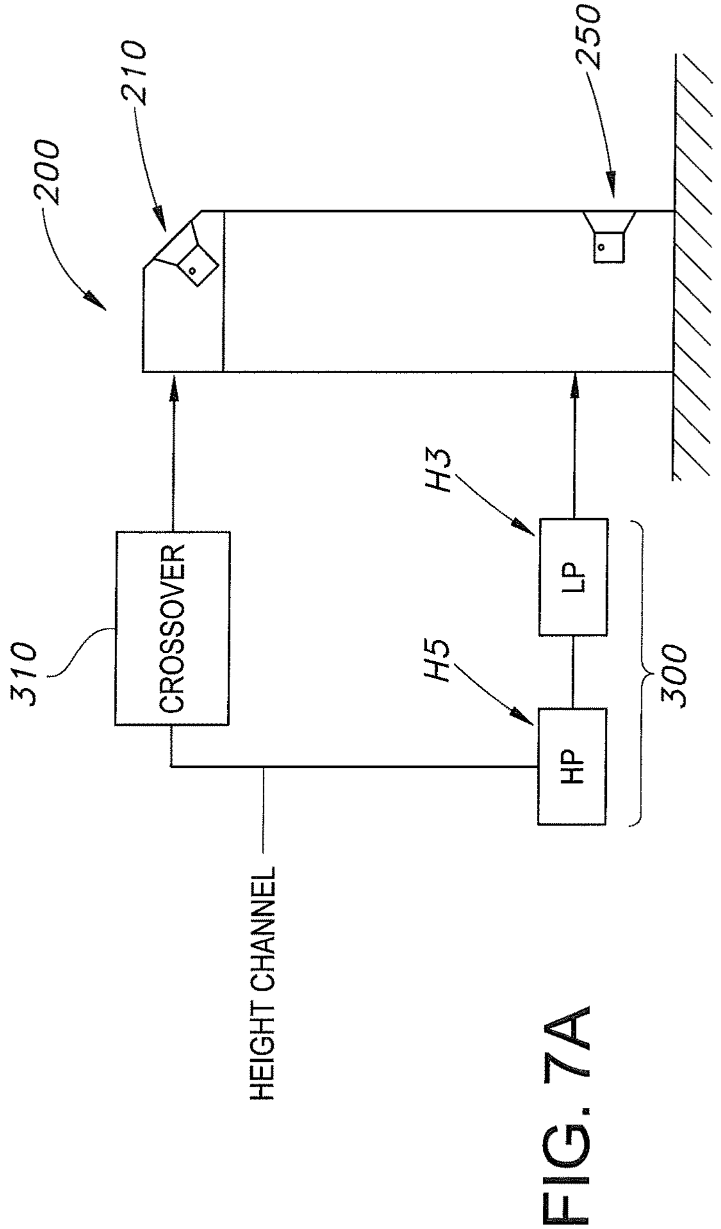
FIG. 7A is a diagram illustrating the Loudspeaker System with Overhead Sound Image Generating (e.g., ATMOS™) Elevation Module and the signal dividing a signal generation Method for Direct Signal Cancellation, in accordance with the present invention.
Figure 7B:
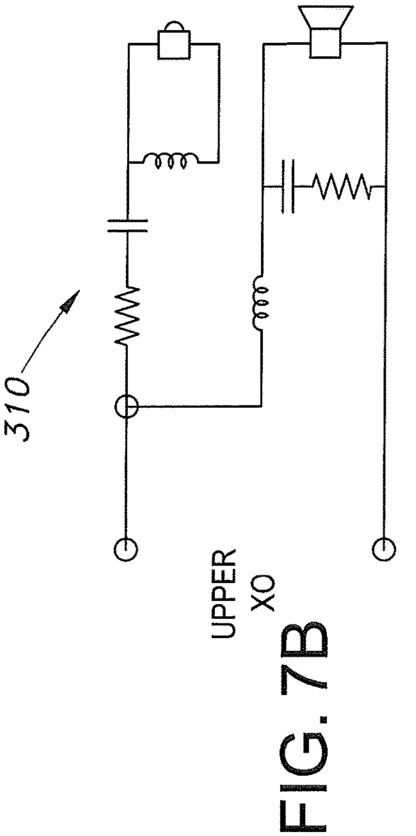
FIGS. 7B and 7C are schematic diagrams illustrating crossover or signal processing circuitry for the Loudspeaker System with an Overhead Sound Image Generating (e.g., ATMOS™) Elevation Module and Direct Signal Cancellation of FIGS. 2-7A, in accordance with the present invention.
Figure 7C:
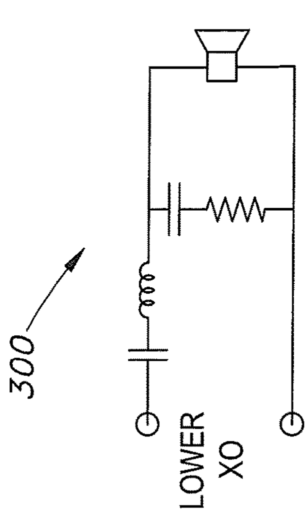

Referring to FIGS. 7A, 7B and 7C, the filtering for the crosstalk cancelling speaker 250 is in addition to any normal or typical crossover for loudspeaker system 200 and comprises the low pass filter H3 and high pass filter H5 as illustrated in FIG. 3. These crossover filter sections are preferably tuned to mimic the undesired direct sound 160 from top mounted elevation speaker 210. Care must be taken to make the magnitude and phase as close as possible to assure maximum cancellation of the undesired direct sound 160 without removing too much bass. A high pass filter (for H5) of 1st or 2nd order in the 100-500 Hz region is believed to be preferable. The low pass filter section's low pass frequencies and order (for H3) depends greatly on the cancellation requirements for direct sound 160 from the top speaker, but something in the 1 kHz region would be reasonable, in first, second or third order. If loudspeaker system 200 is active, delay might also be useful for signals input to the crosstalk cancelling speaker 250. FIGS. 7B and 7C illustrate passive (not active) crossover network circuit topologies for upper crossover 310 and lower crossover 300, in accordance with the present invention.

It will be appreciated by those of skill in the art that the present invention provides a high performance elevation signal reproducing loudspeaker system 200 including having an enclosure or cabinet 220 defining an upper surface 222 and a front surface 224 aimed at a listening position 24 and an elevation speaker, transducer or array 210 for rendering an overhead sound image using reflected sound 150, comprising, in combination an elevation speaker 210 supported upon or proximate the enclosure or cabinet upper surface 222 and aimed to project sound upwardly for rendering sound for reflection off of a ceiling or upper surface of a listening room 12 including the listening position L, wherein said elevation speaker 210 is driven by a height channel signal processed through a height filter having a height filter frequency response curve configured to at least partially remove directional cues from a speaker location, and at least partially insert the directional cues from a reflected or phantom speaker location 210R, the height filter frequency response curve being configured to inserting of directional cues from the reflected speaker location 210R into the desired elevation signal sound 150; wherein said elevation speaker 210 projects a desired reflected sound 150 which reflects from a phantom image location 210R toward the listener L at listening position 24 and also radiates an undesired direct sound 160 toward the listener L at listening position 24. The loudspeaker system 200 also has cancellation speaker, transducer or array 250 which is supported in or proximate the enclosure or cabinet front surface and aimed at the listening position L (preferably near the floor) to project a reversed polarity cancellation signal sound 260 to the listening position L. During operation, loudspeaker system 200 generates the desired reflected sound 150 which listener L perceives as originating from phantom image location 210R and the direct signal cancellation sound 260 from cancellation speaker(s) 250 significantly diminishes or audibly eliminates the undesired direct sound 160 for listener L at listening position 24.

It will be appreciated by those of skill in the art that the present invention provides a high performance elevation signal reproducing loudspeaker system 200 including having an enclosure or cabinet 220 defining an upper surface 222 and a front surface 224 aimed at a listening position 24 and an elevation speaker, transducer or array 210 for rendering an overhead sound image using reflected sound 150, comprising, in combination an elevation speaker 210 supported upon or proximate the enclosure or cabinet upper surface 222 and aimed to project sound upwardly for rendering sound for reflection off of a ceiling or upper surface of a listening room 12 including the listening position L, wherein said elevation speaker 210 is driven by a height channel signal processed through a height filter having a height filter frequency response curve configured to at least partially remove directional cues from a speaker location, and at least partially insert the directional cues from a reflected or phantom speaker location 210R, the height filter frequency response curve being configured to insert directional cues from the reflected speaker location 210R into the desired elevation signal sound 150; wherein said elevation speaker 210 projects a desired reflected sound 150 which reflects from a phantom image location 210R toward the listener L at listening position 24 and also radiates an undesired direct sound 160 toward the listener L at listening position 24. This is illustrated in FIG. 2. The loudspeaker system 200 also has cancellation speaker, transducer or array 250 which is supported in or proximate the enclosure or cabinet front surface and aimed at the listening position L (preferably near the floor) to project a reversed polarity cancellation signal sound 260 to the listening position L. During operation, loudspeaker system 200 generates the desired reflected sound 150 which listener L perceives as originating from phantom image location 210R and the direct signal cancellation sound 260 from cancellation speaker(s) 250 significantly diminishes or audibly eliminates the undesired direct sound 160 for listener L at listening position 24 as illustrated in FIGS. 2, 7A and 7C.

In accordance with the method of the present invention (for providing an improved elevation signal reproduction in a listening room 12 having a listening position L, loudspeaker system 200 is provided with some manner of support (e.g. an enclosure or cabinet 220) defining an upper surface 222 and a front surface 224 aimed at a listening position 24 and elevation speaker 210 is angled forwardly (e.g. at 20 degrees) and supported upon or proximate the enclosure or cabinet upper surface 222 to be aimed to project sound upwardly for rendering sound for reflection off of the ceiling or upper surface of the listening room 12 (as shown in FIG. 2). Cancellation speaker, transducer or array 250 is supported in or proximate the enclosure or cabinet front surface and aimed at the listening position L to project a reversed polarity cancellation signal sound 260 to the listening position L. During playback or operation, the elevation speaker is driven with the height channel signal to generate a desired elevation signal sound 150 project a desired reflected sound 150 upwardly to bounce or reflect from the ceiling and reflects from a phantom image location 210R toward the listener L at listening position 24, but as noted above, the elevation module also radiates an undesired direct sound 160 toward the listener L at listening position 24. In order to address the problems associated with undesired direct sound, during operation or playback, the cancellation speaker 250 is driven with a reversed polarity cancellation signal 260 to project a reversed polarity cancellation signal sound 260 to the listening position L; whereby, during operation, loudspeaker system 200 generates the desired reflected sound 150 which listener L perceives as originating from phantom image location 210R and the direct signal cancellation sound 260 significantly diminishes or audibly eliminates the undesired direct sound 160 for listener L at listening position 24.

In the method of the present invention, the height channel signal is processed through a height filter having a height filter frequency response curve configured to at least partially remove directional cues from a speaker location, and at least partially insert the directional cues from a reflected or phantom speaker location 210R, and the height filter frequency response curve is configured to insert directional cues from the reflected speaker location 210R into the desired elevation signal sound 150; wherein said elevation speaker 210 projects a desired reflected sound 150 which reflects from a phantom image location 210R toward the listener L at listening position 24. The height channel signal is preferably divided as shown in FIG. 7A into upper and lower signal paths where an upper signal path elevation module signal is processed through an upper crossover 310 (see FIG. 7B), and the lower signal path cancellation signal processing section 300 includes a high pass filter H5 and a low pass filter H3, which are configured to generate the reversed polarity cancellation signal 260 (see FIGS. 7B and 7C).

Having described preferred embodiments of a new and improved system and method, it is believed that other modifications, variations and changes will be suggested to those skilled in the art in view of the teachings set forth herein. It is therefore to be understood that all such variations, modifications and changes are believed to fall within the scope of the present invention.

What is claimed is:

1. A method for providing an improved elevation signal reproduction in a listening room having a listening position, comprising:

providing a loudspeaker system comprising an elevation speaker, transducer, or array and an enclosure or cabinet defining an upper surface and a front surface, wherein the enclosure or cabinet is configured for positioning into an operating orientation in which the front surface is aimed at the listening position, and wherein the elevation speaker, transducer, or array is supported upon or proximate to the upper surface of the enclosure or cabinet and aimed to project a desired elevation signal sound upwardly for reflection off a ceiling or upper surface of the listening room;

providing a cancellation speaker, transducer, or array supported in or proximate to the front surface of the enclosure or cabinet and aimed at the listening position to project a reversed polarity cancellation signal sound to the listening position;

driving the elevation speaker, transducer, or array with a height channel signal to generate the desired elevation signal sound and thereby projecting the desired elevation signal sound which reflects from a reflected or phantom image location toward the listening position while also radiating an undesired direct sound toward the listening position;

driving the cancellation speaker with a reversed polarity cancellation signal to project a reversed polarity cancellation signal sound to the listening position;

processing the height channel signal through a height filter having a height filter frequency response curve configured to at least partially remove directional cues from a speaker location and at least partially insert directional cues from the reflected or phantom image location; and dividing the height channel signal via upper and lower signal paths into an upper signal path elevation module signal which is processed through an upper crossover and a lower signal path cancellation signal which is processed through a processing section including a high pass filter and a low pass filter, wherein the high pass filter and the low pass filter are configured to generate the reversed polarity cancellation signal sound, whereby, during operation, the loudspeaker system generates the desired elevation signal sound which is perceived at the listening position as originating from the reflected or phantom image location and the reversed polarity cancellation signal sound significantly diminishes or audibly eliminates the undesired direct sound at the listening position, wherein the height filter frequency response curve is configured to insert the directional cues from the reflected or phantom location into the desired elevation signal sound, and wherein the elevation speaker projects the desired elevation signal sound which reflects from the reflected or phantom image location toward the listening position and also radiates the undesired direct sound toward the listening position.

2. The method of claim 1, wherein the height filter frequency response curve is based on first and second frequency responses of a filter modeling sound, the first frequency response of the filter modeling sound travelling directly from the reflected or phantom image location to the listening position to insert the directional cues from the reflected or phantom image location, the second filter frequency response of the filter modeling sound travelling directly from the speaker location to the listening position to remove the directional cues from the speaker location to the listening position.

3. A method for providing an improved elevation signal reproduction in a listening room having a listening position, comprising:

providing a loudspeaker system comprising an elevation speaker, transducer, or array and an enclosure or cabinet defining an upper surface and a front surface, wherein the enclosure or cabinet is configured for positioning into an operating orientation in which the front surface is aimed at the listening position, and wherein the elevation speaker, transducer, or array is supported upon or proximate to the upper surface of the enclosure or cabinet and aimed to project a desired elevation signal sound upwardly for reflection off a ceiling or upper surface of the listening room;

providing a cancellation speaker, transducer, or array supported in or proximate to the front surface of the enclosure or cabinet and aimed at the listening position to project a reversed polarity cancellation signal sound to the listening position;

driving the elevation speaker, transducer, or array with a height channel signal to generate the desired elevation signal sound and thereby projecting the desired elevation signal sound which reflects from a reflected or phantom image location toward the listening position while also radiating an undesired direct sound toward the listening position; and driving the cancellation speaker with a reversed polarity cancellation signal to project a reversed polarity cancellation signal sound to the listening position, whereby, during operation, the loudspeaker system generates the desired elevation signal sound which is perceived at the listening position as originating from the reflected or phantom image location and the reversed polarity cancellation signal sound significantly diminishes or audibly eliminates the undesired direct sound at the listening position, wherein said loudspeaker system comprises an active loudspeaker system, and wherein driving the cancellation speaker in said active loudspeaker includes driving said cancellation speaker with a delayed, reversed polarity cancellation signal to project a delayed reversed polarity cancellation signal sound to the listening position.

4. The method of claim 3, further comprising:

using a virtual height filter to apply a height filter frequency response curve to an audio signal transmitted to the elevation speaker, transducer, or array, wherein the virtual height filter at least partially removes directional cues from the speaker location and at least partially inserts directional cues from the reflected or phantom image location, wherein the height filter frequency response curve is based on first and second frequency responses of a filter modeling sound, the first frequency response of the filter modeling sound travelling directly from the reflected or phantom image location to the listening position to insert the directional cues from the reflected or phantom image location, the second filter frequency response of the filter modeling sound travelling directly from the speaker location to the listening position to remove the directional cues from the speaker location to the listening position.

5. A method for providing an improved elevation signal reproduction in a listening room having a listening position, comprising:

providing an active loudspeaker system comprising an elevation speaker, transducer, or array and an enclosure or cabinet defining an upper surface and a front surface, wherein the enclosure or cabinet is configured for positioning into an operating orientation in which the front surface is aimed at a listening position, and wherein the elevation speaker, transducer, or array is supported upon or proximate to the upper surface of the enclosure or cabinet and aimed to project a desired elevation signal sound upwardly for reflection off a ceiling or upper surface of the listening room;

providing a cancellation speaker, transducer or array supported in or proximate to the front surface of the enclosure or cabinet and aimed at the listening position to project a reversed polarity cancellation signal sound to the listening position;

driving the elevation speaker, transducer, or array with a height channel signal to generate the desired elevation signal sound and thereby projecting the desired elevation signal sound which reflects from a reflected or phantom image location toward the listening position while also radiating an undesired direct sound toward the listening position;

driving the cancellation speaker with a delayed, reversed polarity cancellation signal to project a reversed polarity cancellation signal sound to the listening position;

whereby, during operation, the loudspeaker system generates the desired elevation signal sound which is perceived at the listening position as originating from the reflected or phantom image location and the reversed polarity cancellation signal sound significantly diminishes or audibly eliminates the undesired direct sound at the listening position.

6. The method of claim 5, further comprising:

using a virtual height filter to apply a height filter frequency response curve to an audio signal transmitted to the elevation speaker, transducer, or array, wherein the virtual height filter at least partially removes directional cues from the speaker location and at least partially inserts directional cues from the reflected or phantom image location, wherein the height filter frequency response curve is based on first and second frequency responses of a filter modeling sound, the first frequency response of the filter modeling sound travelling directly from the reflected or phantom image location to the listening position to insert the directional cues from the reflected or phantom image location, the second filter frequency response of the filter modeling sound travelling directly from the speaker location to the listening position to remove the directional cues from the speaker location to the listening position.

* * * * *